United States Patent
Tracey et al.

(10) Patent No.: US 11,873,188 B2
(45) Date of Patent: Jan. 16, 2024

(54) REEL UNWINDING AND WINDING CONTROL

(71) Applicant: GREAT STUFF, INC., Austin, TX (US)

(72) Inventors: James B. A. Tracey, Austin, TX (US); Marty L. Gillespie, Austin, TX (US)

(73) Assignee: GREAT STUFF, INC., Austin, TX (US)

( * ) Notice: Subject to any disclaimer, the term of this patent is extended or adjusted under 35 U.S.C. 154(b) by 329 days.

(21) Appl. No.: 17/241,636

(22) Filed: Apr. 27, 2021

(65) Prior Publication Data

US 2021/0331890 A1     Oct. 28, 2021

Related U.S. Application Data

(60) Provisional application No. 63/067,751, filed on Aug. 19, 2020, provisional application No. 63/016,818, filed on Apr. 28, 2020.

(51) Int. Cl.
*B65H 75/44* (2006.01)

(52) U.S. Cl.
CPC ..... *B65H 75/4484* (2013.01); *B65H 75/4486* (2013.01); *B65H 2701/34* (2013.01)

(58) Field of Classification Search
CPC ............... B65H 75/44; B65H 75/4484; B65H 75/4486; B65H 2701/34
See application file for complete search history.

(56) References Cited

U.S. PATENT DOCUMENTS

| | | |
|---|---|---|
| D419,961 S | 2/2000 | Weatherill |
| 6,279,848 B1 | 8/2001 | Mead |
| 6,981,670 B2 | 1/2006 | Harrington |
| 7,021,583 B2 | 4/2006 | Weatherill et al. |

(Continued)

FOREIGN PATENT DOCUMENTS

| | | |
|---|---|---|
| CN | 107324160 A | 11/2017 |
| DE | 26 23 366 | 12/1977 |

(Continued)

OTHER PUBLICATIONS

International Search Report and Written Opinion dated Sep. 16, 2021, in International Application No. PCT/US2021/029462, 20 pages.

*Primary Examiner* — Sang K Kim
(74) *Attorney, Agent, or Firm* — Knobbe, Martens, Olson & Bear LLP

(57) ABSTRACT

An electrical cord reel assembly can include a spool configured to wind and unwind an electrical cord therefrom. The electrical cord reel assembly can include a motor configured to rotate the spool to wind and unwind the electrical cord about the spool. The electrical cord reel assembly can include a controller in electrical communication with the motor and the electrical cord. The controller can be configured to, in response to an unwind command, place or maintain the electrical cord in a power off state. The controller can be configured to in response to the unwind command, transmit an unwind signal to the motor to cause the motor to unwind the electrical cord from the spool. The controller can be configured to automatically place the electrical cord in a power on state based at least in part on an amount of rotation of the spool during the unwinding.

38 Claims, 11 Drawing Sheets

(56) References Cited

U.S. PATENT DOCUMENTS

| | | |
|---|---|---|
| 7,121,495 B2 | 10/2006 | Cadwell |
| 7,216,659 B2 | 5/2007 | Caamano et al. |
| 7,320,843 B2 | 1/2008 | Harrington |
| D567,636 S | 4/2008 | Morris et al. |
| 7,350,736 B2 | 4/2008 | Caamano et al. |
| 7,419,038 B2 | 9/2008 | Caamano et al. |
| 7,503,338 B2 | 3/2009 | Harrington et al. |
| 7,533,843 B2 | 5/2009 | Caamano et al. |
| D626,818 S | 11/2010 | Tracey |
| D632,548 S | 2/2011 | Tracey et al. |
| 8,317,121 B2 | 11/2012 | Tracey |
| 8,695,912 B2 | 4/2014 | Tracey et al. |
| D705,730 S | 5/2014 | Kretzschmar et al. |
| 8,746,605 B2 | 6/2014 | Tracey et al. |
| 8,771,005 B2 | 7/2014 | Tracey et al. |
| 8,801,458 B2 | 8/2014 | Ceraldi et al. |
| 8,878,397 B2 | 11/2014 | Tracey |
| 8,925,851 B2 | 1/2015 | Tracey et al. |
| 8,995,099 B2 | 3/2015 | Tracey et al. |
| 9,067,759 B2 | 6/2015 | Tracey et al. |
| 9,079,748 B2 | 7/2015 | Tracey et al. |
| 9,259,968 B2 | 2/2016 | Tracey |
| 9,793,699 B2 | 10/2017 | Yun |
| 9,806,505 B2 | 10/2017 | Tracey et al. |
| 9,950,634 B2 * | 4/2018 | Bianco .................. B60L 53/18 |
| 10,370,218 B2 | 8/2019 | Tracey et al. |
| 10,589,958 B2 | 3/2020 | Tracey |
| 2005/0011968 A1 | 1/2005 | Tracey et al. |
| 2005/0087645 A1 | 4/2005 | Tracey et al. |
| 2007/0194163 A1 | 8/2007 | Gerard et al. |
| 2008/0074893 A1 | 3/2008 | Ham |
| 2010/0141425 A1 | 6/2010 | Tracey et al. |
| 2013/0032654 A1 | 2/2013 | Tracey et al. |
| 2014/0021283 A1 | 1/2014 | Tracey et al. |
| 2014/0021284 A1 | 1/2014 | Tracey et al. |
| 2014/0261766 A1 | 9/2014 | Tracey et al. |
| 2017/0066622 A1 | 3/2017 | Ge |
| 2017/0350931 A1 | 12/2017 | Alford et al. |
| 2019/0004486 A1 | 1/2019 | Hall et al. |
| 2019/0248621 A1 | 8/2019 | Tracey |
| 2019/0292005 A1 | 9/2019 | Miller et al. |

FOREIGN PATENT DOCUMENTS

| | | |
|---|---|---|
| WO | WO 2017/222557 A1 | 12/2017 |
| WO | WO 2018/075365 A1 | 4/2018 |

* cited by examiner

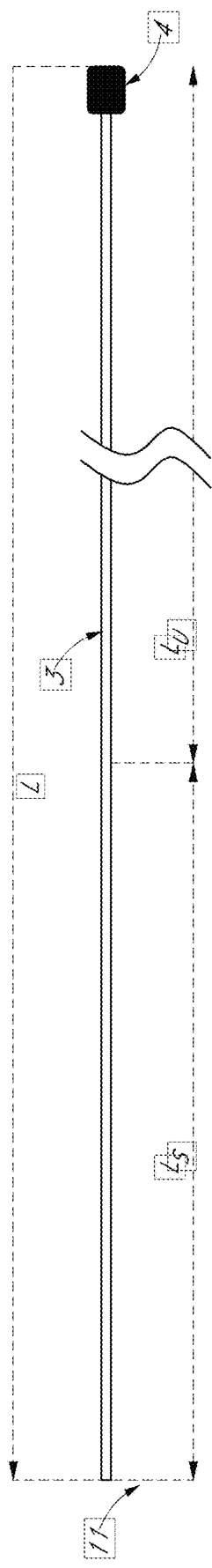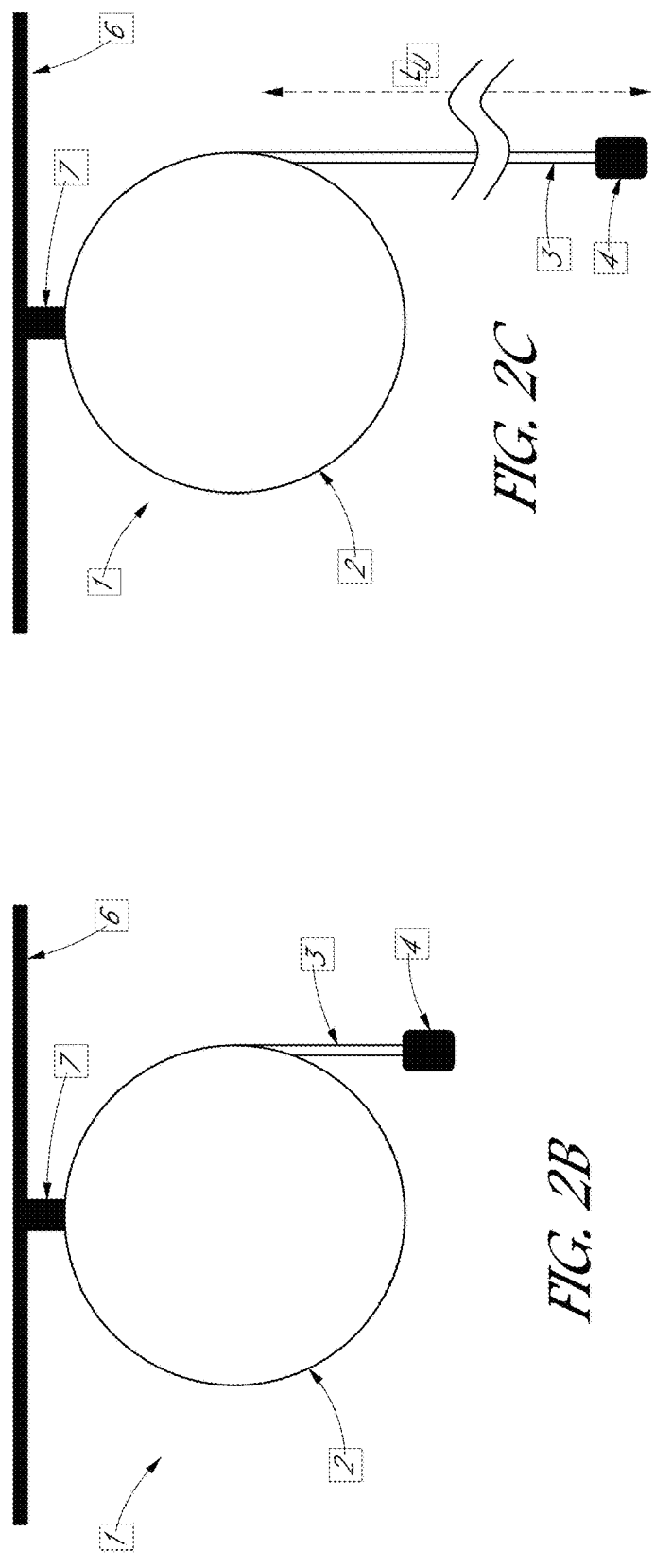

REEL UNWINDING AND WINDING CONTROL

CROSS-REFERENCE TO RELATED APPLICATIONS

This application claims priority to U.S. Provisional Patent Application No. 63/016,818, filed Apr. 28, 2020, and to U.S. Provisional Patent Application No. 63/067,751, filed Aug. 19, 2020, the entire contents of each of which are hereby incorporated by reference in their entirety and for all purposes.

BACKGROUND

Field of the Invention

The field relates to a reel assembly configured to control unwinding and winding of a linear element such as an electrical cord.

Description of the Related Art

Conventional reel assemblies (such as hose reels, cord reels, etc.) include a mechanical spool and a linear element (e.g., hose, cord, etc.) wound around the spool. Some conventional reels are manually operated, requiring the user to physically rotate the reel, or drum, to spool the hose. This can be tiresome and time-consuming for users, especially when the hose is of a substantial length. Accordingly, there remains a continuing need for improved reel assemblies.

SUMMARY

In one embodiment, an electrical cord reel assembly is disclosed. The electrical cord reel assembly can include a spool configured to wind and unwind an electrical cord therefrom. The electrical cord reel assembly can include a motor configured to rotate the spool to wind and unwind the electrical cord about the spool. The electrical cord reel assembly can include a controller in electrical communication with the motor and the electrical cord. The controller can be configured to, in response to an unwind command, place or maintain the electrical cord in a power off state. The controller can be configured to in response to the unwind command, transmit an unwind signal to the motor to cause the motor to unwind the electrical cord from the spool. The controller can be configured to automatically place the electrical cord in a power on state based at least in part on an amount of rotation of the spool during the unwinding.

In another embodiment, a method of controlling a reel assembly is disclosed. The reel assembly can comprise a spool and an electrical cord coupled with the spool and configured to wind and unwind about the spool. The method can include in response to an unwind command, placing or maintaining the electrical cord in a power off state. The method can include, in response to the unwind command, transmitting an unwind signal to a motor to cause the motor to unwind the electrical cord from the spool. The method can include automatically placing the electrical cord in a power on state based at least in part on an amount of rotation of the spool during the unwinding.

In another embodiment, a reel assembly is disclosed. The reel assembly can include a spool configured to wind and unwind a linear element therefrom. The reel assembly can include a motor configured to rotate the spool to wind and unwind the linear element about the spool. The reel assembly can include a controller in electrical communication with the motor. The controller can be configured to, in response to an unwind command, transmit an unwind signal to the motor to cause the motor to unwind the linear element from the spool. The controller can be configured to monitor an amount of rotation of the spool during the unwinding.

In another embodiment, a method of controlling a reel assembly is disclosed. The reel assembly can comprise a spool and a linear element coupled with the spool and configured to wind and unwind about the spool. The method can comprise, in response to an unwind command, transmitting an unwind signal to a motor to cause the motor to unwind the linear element from the spool. The method can comprise monitoring an amount of rotation of the spool during the unwinding.

In another embodiment, a reel system can include a plurality of reel assemblies, each reel assembly of the plurality of reel assemblies configured to wind and unwind an electrical cord therefrom. Each reel assembly of the plurality of reel assemblies can include a motor configured to rotate the spool to wind and unwind the linear element about the spool. Each reel assembly of the plurality of reel assemblies can include a controller in electrical communication with the motor. The reel system can include a master control system to be in wireless communication with the controller of each reel assembly of the plurality of reel assemblies, the master control system configured to control the operation of the plurality of reel assemblies.

In another embodiment, a reel assembly can include a spool configured to wind and unwind a linear element therefrom. The reel assembly can include a motor configured to rotate the spool to wind and unwind the linear element about the spool. The reel assembly can include a programmable controller in electrical communication with the motor. The controller can include processing electronics and a memory device for storing instructions executable by the processing electronics. The processing electronics can be configured to automatically transmit an unwind signal to the motor to cause the motor to unwind from the spool a first length of the linear element stored in the memory device.

In another embodiment, a reel assembly can include a hub having a first end and a second end opposite the first end, each of the first and second ends comprising one or a plurality of first alignment features; and a first flange and a second flange connectable to the respective first and second ends by way of one or a plurality of second alignment features, the first and second alignment features connectable by way of a tool-less connection.

In another embodiment, a reel assembly can include a hub; a first flange disposed at a first end of the hub, the first flange including a first bump extending inwardly at a first angular position of the first flange; and a second flange disposed at a second end of the hub, the second flange including a second bump extending inwardly at a second angular position of the second flange, the first and second angular positions disposed circumferentially offset from one another.

In another embodiment, a reel assembly comprising can include a spool configured to wind and unwind a linear element therefrom; a motor configured to rotate the spool to wind and unwind the linear element about the spool; a controller in electrical communication with the motor, the controller configured to send instructions to the motor to wind and unwind the linear element; and a remote control configured to wirelessly communicate with the controller, the remote control comprising a button, the remote control configured to send a first signal to the controller to instruct the motor to rotate the spool to wind the linear element about the spool when the user depresses the button a first number of times, the remote control configured to send a second signal to the controller to instruct the motor to rotate the spool to unwind the linear element from the spool when the user depresses the button a second number of times.

BRIEF DESCRIPTION OF THE DRAWINGS

FIG. 2A is a schematic side view of an electrical cord, according to various embodiments.

FIG. 2B is a schematic side view of a reel assembly with an electrical cord wound around the spool.

FIG. 2C is a schematic side view of the reel assembly of FIG. 2B during an unwinding process.

DETAILED DESCRIPTION

In conventional reel assemblies, a linear element (such as an electrical cord, water hose, air hose, telecommunications cable, a mechanical cable (e.g., a metal cable)) is wound around a spool. It can be challenging to monitor an amount by which the linear element is wound or unwound around the spool, which may be important in some applications. For example, electrical cord reels can generate heat when wrapped around the spool due to the amount of electricity running through the wound cord. Some standards or certifying bodies (e.g., Underwriter Laboratories, or UL) may have various requirements related to heat generation by electrical cord reels. If the length of electrical cord wound around the spool generates excessive heat (e.g., exceeds a threshold temperature), then the reel assembly may not meet various standards and/or may be dangerous during operation.

Accordingly, various embodiments disclosed herein can beneficially maintain a temperature of the electrical cord reel below a threshold temperature during operation. For example, a user can interact with a remote control to initiate an unwind command that is wirelessly transmitted to the controller. In response to the unwind command, the controller can place or maintain the electrical cord in a power off state, and can send an unwind signal to a motor to initiate the unwinding. During the unwinding, a controller can monitor an amount of rotation of the spool during unwinding (for example, using a Hall effect sensor connected to a motor) and, if a length of electrical cord that is unwound from the spool during unwinding exceeds a threshold, the controller can place the electrical cord in a power on state. The electrical cord can continue unwinding until the user transmits an unwind termination command to the controller with the remote control. In other embodiments, the controller can automatically transmit the unwind termination command to the controller. The user can use the electrical cord and, when finished, interact with the remote control to initiate a wind command that is wirelessly transmitted to the controller. During the winding, the controller can monitor an amount of electrical cord that is being wound around the spool and, if the amount wound around the spool exceeds a threshold, the electrical cord can be placed in the off state to maintain the temperature of the electrical cord below a threshold temperature. Although various embodiments illustrated herein refer to electrical cord reels, it should be appreciated that the embodiments can also be used with other types of linear elements, such as air hoses, water hoses, metal cables (e.g., steel cables), etc.

Figure 3:
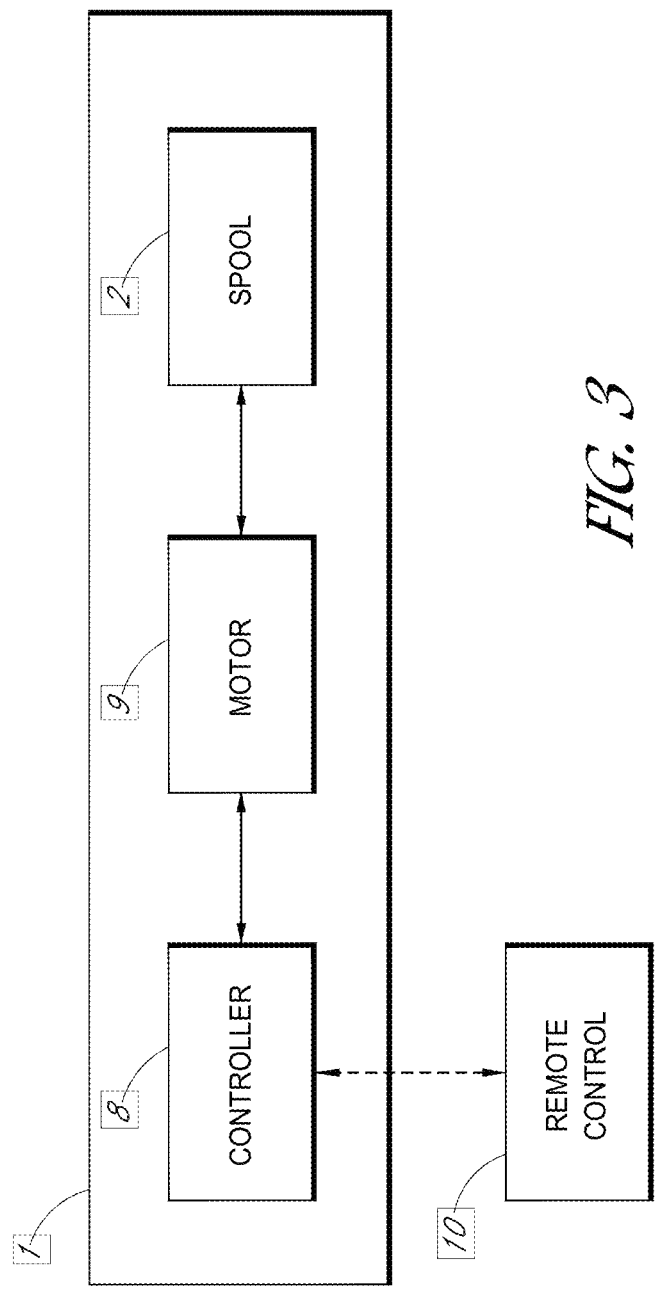
FIG. 3 is a schematic system diagram of a reel assembly, according to various embodiments.

Various embodiments disclosed herein relate to an electrical cord reel assembly 1 that includes a spool 2 and an electrical cord 3 coupled with the spool 2 and configured to wind and unwind about the spool 2, as shown in FIGS. 1A-3. The electrical cord 3 can include an interface member 4 (e.g., a plug) at a distal end of the cord 3. As shown in FIG. 3, the reel assembly 1 can also include a motor 9 configured to rotate the spool 2 to wind and unwind the electrical cord 3 about the spool 2. The reel assembly 1 can include a controller 8 in electrical communication with the motor 9 and the electrical cord 3. A remote control 10 can also be provided. The remote control 10 can be in wireless communication with the controller 8 to control operation of the reel assembly 1. The remote control 10 can comprise a user interface (such as a button, switch, touch screen interface with display, etc.). A user can send commands to the controller 8 by interacting with the user interface of the remote control 10, which can transmit the command(s) to the controller 8. In response to the commands, the controller 8 can transmit corresponding signals to the motor 9 and/or the electrical cord 3.

As shown in FIGS. 1A-1D and 2B-2C, in some embodiments, the spool 2 can be mounted to a ceiling 6 of a building. As explained below in connection with FIG. 5, in various embodiments, numerous reel assemblies can be provided on the ceiling 6 and controlled with the systems and methods described herein. For example, as shown in FIGS. 1A-1D, the spool 2 can be mounted to a track 5 on a ceiling 6. The spool 2 can move along the track 5 to laterally reposition the spool 2 as desired. As shown in FIGS. 2B-2C, in some embodiments, the spool 2 can be mounted to the ceiling 6 by way of a reel support 7. The reel support 7 can comprise any suitable type of reel support, including any of the reel supports described throughout, for example, U.S. Pat. No. 8,925,851, the entire contents of which are hereby incorporated by reference herein in their entirety and for all purposes. Moreover, in some embodiments, the reel assembly 1 can comprise a pivotable reel assembly that can pivot about a pivot axis, such as any of the pivotable reel assemblies described throughout U.S. Patent Publication No. US 2019/0248621, the entire contents of which are hereby incorporated by reference herein in their entirety and for all purposes. In other embodiments, the reel assembly 1 may not be pivotable about a pivot axis. The reel assembly can include various control systems and spooling and unspooling functionality, including the systems described throughout U.S. Pat. No. 8,746,605, the entire contents of which are hereby incorporated by reference herein in their entirety and for all purposes.

The reel assembly 1 can be mounted in any suitable installation. For example, one or a plurality of reel assemblies 1 can be mounted to the ceiling 6 of an aircraft hangar to be used during maintenance of airplanes, to the ceiling 6 of a manufacturing plant, or to the ceiling 6 of any other suitable building. For example, as explained above, the reel assembly 1 can be mounted to the ceiling of a building using a reel mounting assembly similar to those illustrated and described in connection with U.S. Pat. No. 8,925,851 ("the '851 patent"), the entire contents of which are hereby incorporated by reference herein in their entirety and for all purposes. The use of such reel mounting assemblies can facilitate easier installation and easier replacement and repair. For example, the reel mounting assemblies described in the '851 patent can enable the reel assembly to easily slide into a baseplate mounted to the ceiling or other structure. The reel assembly 1 may additionally or alternatively be mounted to any other suitable structure or vehicle. For example, in some embodiments, the reel assembly can comprise a linear element such as a mechanical cable wound around a spool mounted to any suitable structure.

It can be challenging to perform maintenance or to replace reel assemblies 1 that are mounted on some structures, such as aircraft hangars which may be several tens of feet high. Other reel assemblies may include spools that are hardwired to the cord, such that an electrician may need to be hired for maintenance or replacement of the reel assembly. Various embodiments disclosed herein can utilize a cord that is easily replaced without removing the reel assembly or having to hire an electrician to replace the cord. Moreover, in some embodiments, the cord and removable connector can be pre-installed or connected to the reel assembly before use by the end user. The end user can simply mount the reel assembly (with pre-assembled cord) to a desired structure (such as a ceiling), plug a pigtail connection of the reel assembly in to a power outlet, and begin using the reel assembly without further installation. In other embodiments, the cord may be provided separately to the end user, and the end user can install (or replace) the cord by simply inserting the terminals of the cord into the removable connector.

Figure 1A:
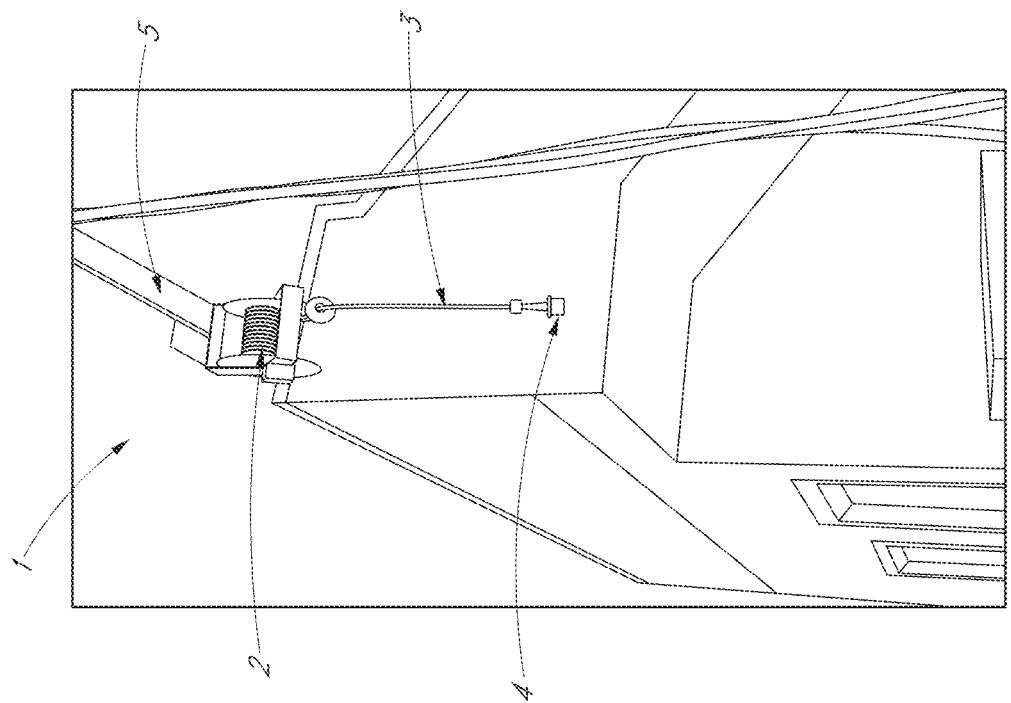
FIGS. 1A-1D are images showing a ceiling-mounted reel assembly at various stages of unwinding an electrical cord, according to one embodiment.
Figure 1B:
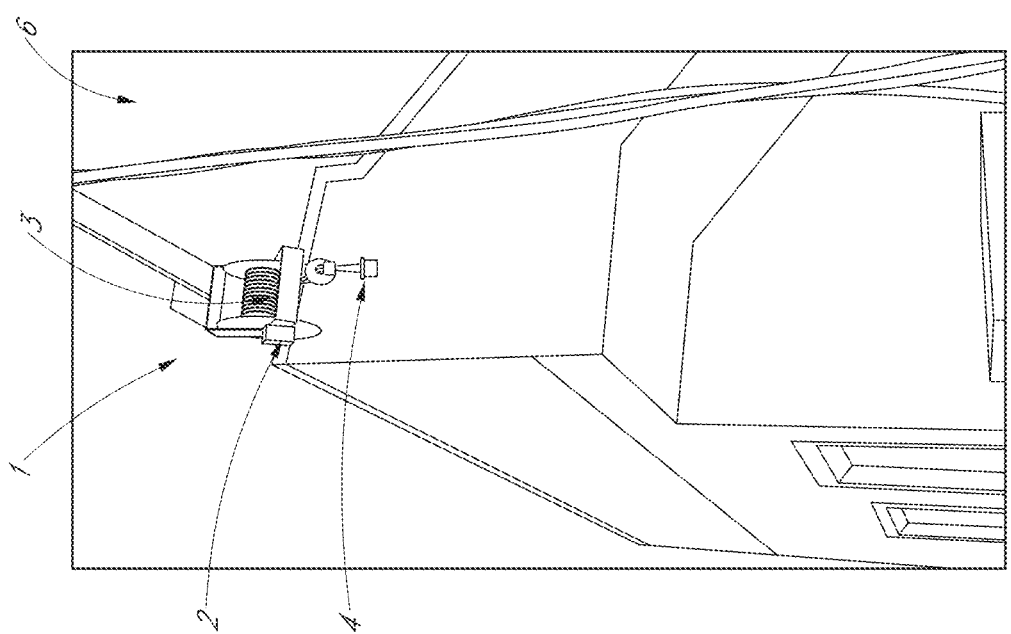
Figure 1D:
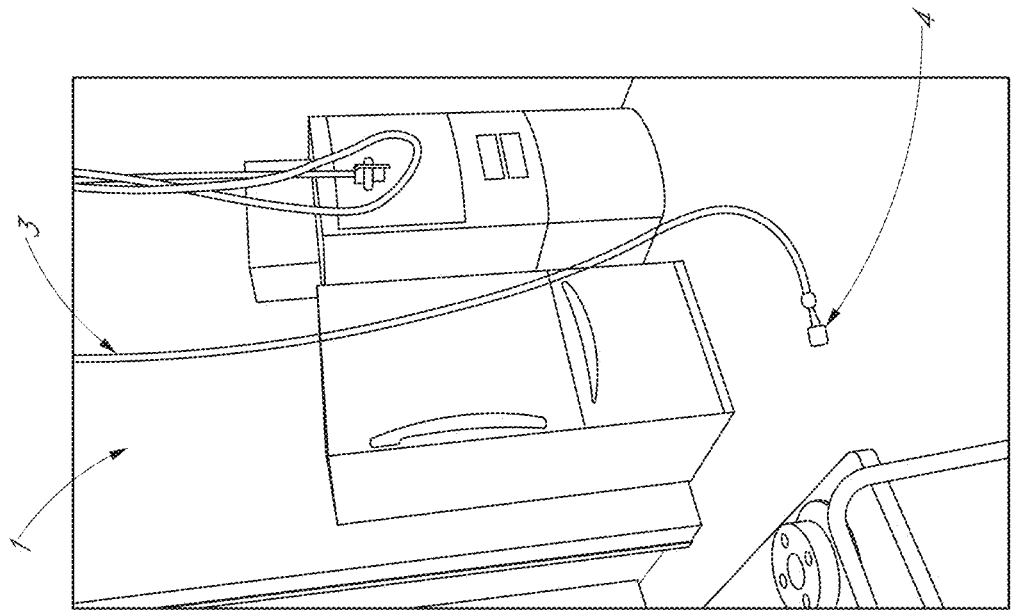
Figure 1C:
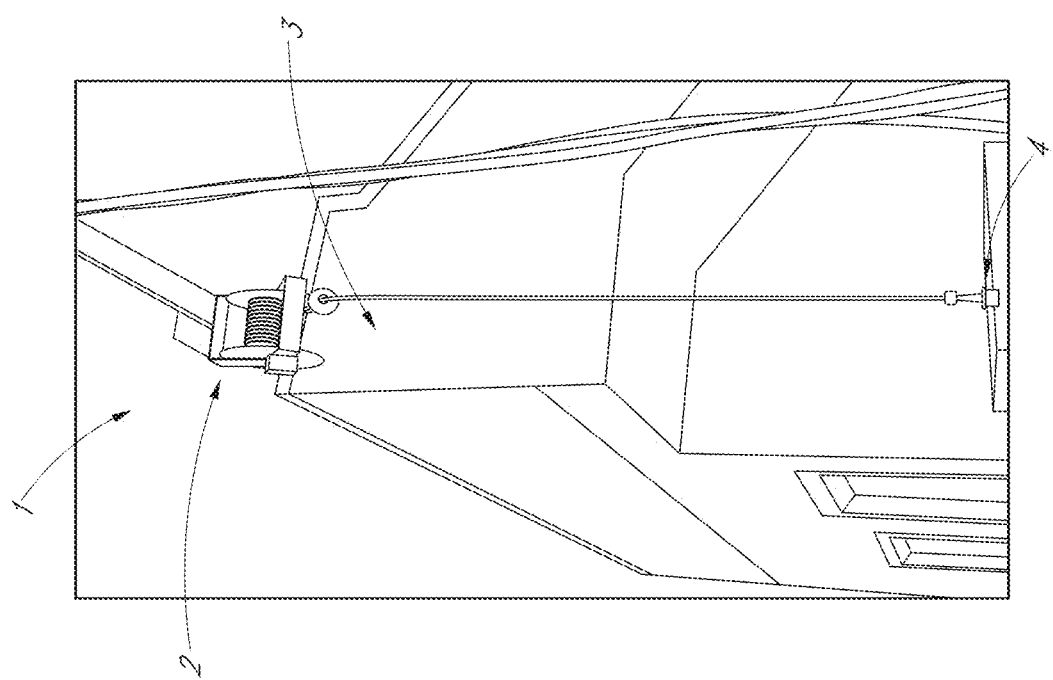
Figure 1E:
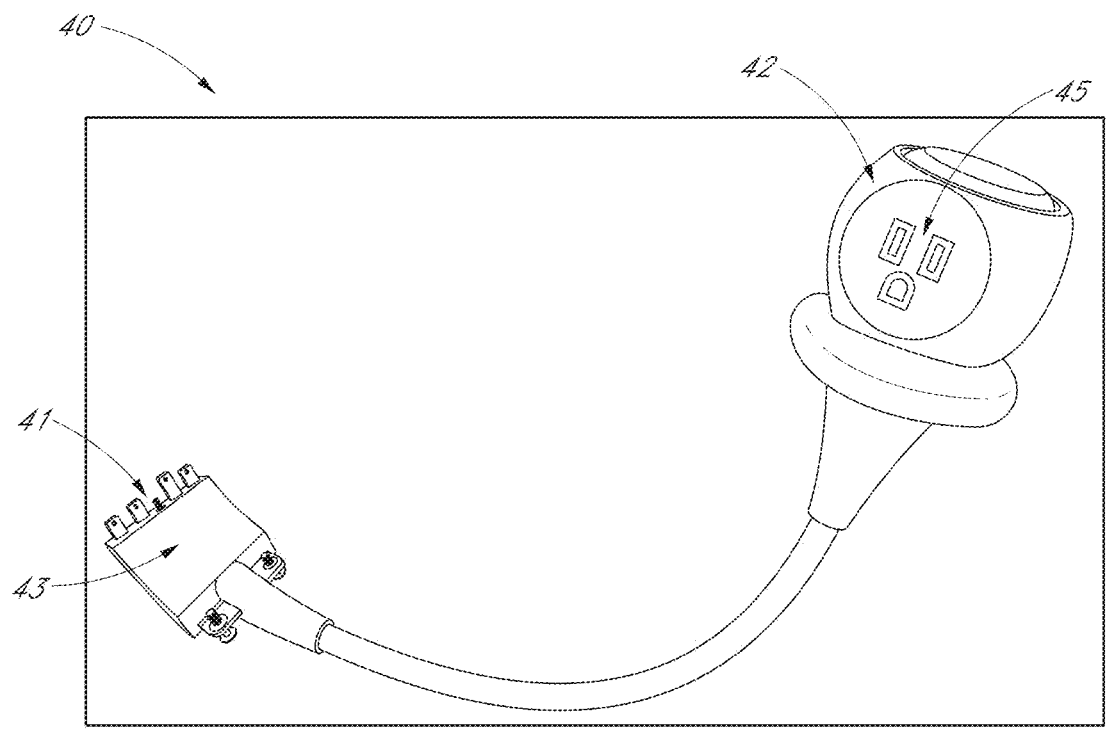
FIGS. 1E and 1F are images of a connector cord configured to removably connect the electrical cord of FIGS. 1A-1D to a spool of the reel assembly.
Figure 1F:
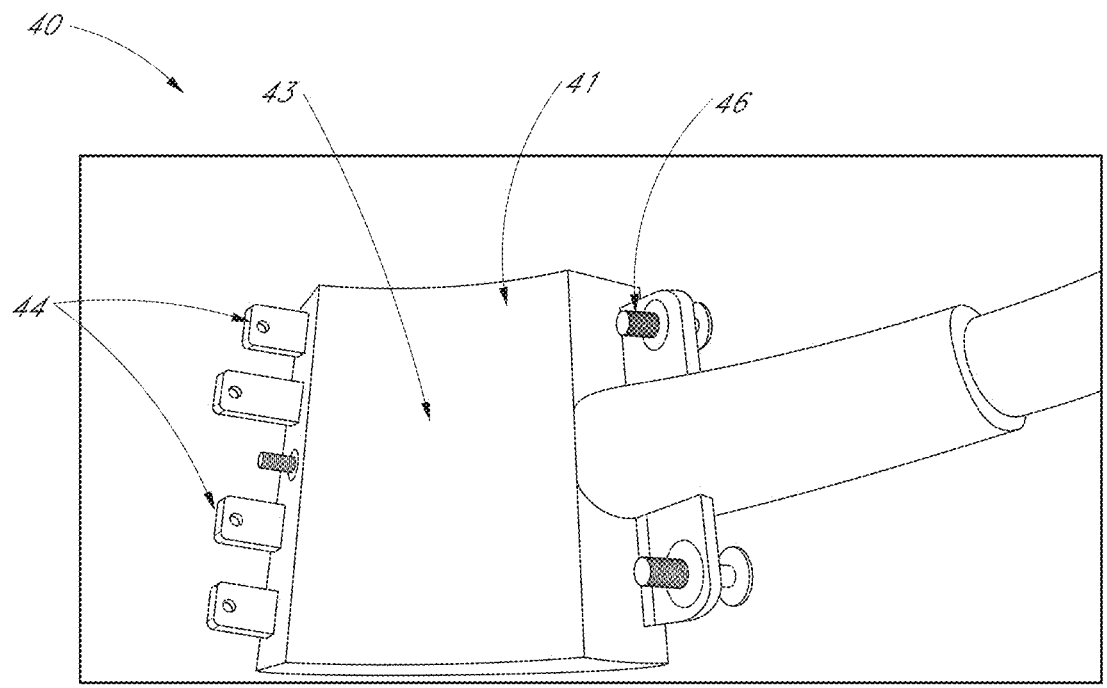

For example, as shown in FIGS. 1E-1F, the assembly 1 can include a removable elongate or linear connecting element 40. The linear connecting element 40 can electrically connect the cord 3 to the spool 2. For example, the linear connecting element 40 can comprise a first connector 41 configured to electrically connect to power electronics or cables in the spool 2 and a second connector 42 at an opposite end of the connecting element 40 that is configured to electrically connect to an end of the cord 3. As shown, the first connector 41 can include a concave surface 43 sized and shaped to conform to a curved surface of the spool 2 so as to facilitate mechanical connection to the spool 2. The first connector 41 can include a plurality of terminals 44 configured to connect to corresponding terminals of the spool 2. In the illustrated embodiment, four terminals 44 are shown, which can include terminals for a hot wire, a neutral wire, a ground wire, and a signal wire. Additional details of cords that include four wires may be found throughout U.S. Pat. No. 8,995,099, the entire contents of which are incorporated by reference herein in their entirety and for all purposes. In other embodiments, however, three terminals 44 may be provided to connect, respectively, to a hot wire, a neutral wire, and a ground wire. In various embodiments, the cord 3 can include three terminals 44, four terminals, or five terminals 44. The cord 3 can include wires of any suitable gauge, such as 8-gauge, 10-gauge, 12-gauge, 14-gauge, etc. The cord 3 can be used in three-phase units in various embodiments as well.

Beneficially, unlike other conventional reels, the embodiments disclosed herein can utilize electrical cord reels similar to those shown and described in U.S. Pat. No. 8,801,458 ("the '458 patent"), the entire contents of which are hereby incorporated by reference herein in their entirety and for all purposes. The use of cord reels similar to those described in the '458 patent can facilitate easier installation, replacement, and/or maintenance of the reel assembly and cord. For example, the user can easily replace a damaged electrical cord using such cord reels without requiring an electrician and with considerably less effort than other cord reel assemblies.

When the electrical cord 3 is wound about the spool 2 with electrical power turned on (e.g., in a power on state), heat is generated which increases the temperature of the electrical cord 3 and other components of the reel assembly 1. For example, conventional reel assemblies (e.g., reel assemblies other than those designed or made by the Applicant) that are excessively large may include long lengths of cord (or may encourage the user to utilize a long length of cord), which may increase the temperature beyond a threshold temperature when powered on and may cause the reel to fail certification standards (e.g, UL heat certification standards). In general, as a longer length of cord 3 is wound about the spool 2, more heat may be generated. If the temperature of the cord 3 and/or of other components near the cord 3 exceed a threshold temperature (e.g., UL heat certification standards), then user safety may be negatively affected and/or components of the reel assembly 1 may be damaged. Accordingly, there remains a continuing need for improved thermal management systems and methods for reel assemblies.

In some embodiments, a sensor can be provided to monitor a temperature of the electrical cord 3 and nearby components. For example, in some embodiments one or a plurality of thermostats (e.g., two highly-rated thermostats) can be provided to monitor the temperature of the electrical cord 3 and surrounding components to ensure compliance with heat generation standards (such as UL heat standards). The embodiments disclosed herein can provide multiple (e.g., three), redundant layers of thermal monitoring and protection. In various embodiments disclosed herein, the power to the cord 3 may be placed or maintained in a power off state when the length of the cord 3 wound around the spool 2 exceeds a threshold temperature length. If the cord is (or becomes) sufficiently unwound from the spool 2 such that the length of cord 3 wound around the spool 2 is less than the threshold length, the power to the cord 3 can be turned on. If for some reason the temperature exceeds a threshold temperature, then one or all of the one or plurality of thermostats can place the electrical cord in a power off state for redundant safety measures. In embodiments that utilize more than one thermostat or temperature sensor, either or all of the thermostat(s) can provide redundancy to automatically shut off power so as to maintain the temperature lower than the threshold temperature.

Various embodiments disclosed herein can beneficially reduce heat generation in the reel assembly 1 during use. As explained above, the heat generated in the cord 3 when electrical power is turned on is higher when a relatively long length of cord 3 is spooled about the reel 1 (e.g., spool length) as compared to when a short length of cord 3 is spooled about the reel 1. As shown in FIG. 2A in a completely unwound state, the cord 3 can have an overall length L extending from a proximal end 11 configured to mechanically and/or electrically connect to the spool 2 to a distal end that includes the interface member 4. As the cord 3 is wound or unwound from the spool 2, an unspooled length $L_U$ of cord 3 can be unwound out from the spool 2, and a spooled length $L_S$ can remain wound around the spool 2, such that $L = L_S + L_U$. The reel assembly 1 can have a threshold temperature length $L_T$ such that, when the spooled length $L_S$ of cord 3 wound about the spool 2 is greater than the threshold temperature length $L_T$, the temperature of the cord 3 (or at locations near the cord) exceeds an acceptable threshold temperature when electrical power to the cord 3 is turned on. When the spooled length $L_S$ of cord 3 wound about the spool 2 is less than or equal to the threshold temperature length $L_T$, the temperature of the cord 3 (or at locations near the cord) is less than or equal to an acceptable threshold temperature when electrical power to the cord 3 is turned on. Accordingly, various embodiments disclosed herein manage heat generation in reel assemblies 1 by monitoring the spooled length $L_S$ and/or unspooled length $L_U$ of cord 3, e.g., length of cord 3 that is wound about or unwound from the spool 2 at a particular moment. Additionally, as explained above, the use of redundant thermostats can further improve the safety of the reel assembly 1 disclosed herein as compared with conventional reels.

In various embodiments, the reel assembly 1 can be operated in a "follow me" mode in which the controller 8 can be configured to monitor and/or control an amount of slack in the linear element. For example, the controller 8 can monitor the tension in the linear element (for example, by monitoring back electromotive force, or EMF, of the motor 9) to determine whether there is slack in the linear element. If slack is detected, the controller 8 can instruct the motor 9 to wind in the linear element until a suitable amount of tension is detected (e.g., when the tension exceeds a first predetermined tension threshold). Beneficially, controlling the slack in such a manner can reduce the amount of slack in the linear element during use such that the linear element does not interfere with the operation of the device. As an example, a buffer or robotic device can move continuously along the ground in operation. If there is too much slack in the linear element, the linear element can pile up along the ground and interfere with the device. Reducing the slack can beneficially improve the operation of the system. Similarly, if there is too much tension detected in the linear element (e.g., when the controller 8 monitors the back EMF to determine that the tension exceeds a second tension threshold), the controller 8 can instruct the motor 9 to unspool the linear element to provide the suitable amount of slack. By controlling the slack, the system (e.g., a buffer, robotic device, etc.) can recharge the battery if the battery is too low.

When the battery is recharged (e.g., the battery level is above a battery level threshold), the linear element can be removed manually by the user, or can be automatically disconnected. For example, a magnetic or electromagnetic connector can connect the linear element (e.g., an electrical cord) to the system (e.g., to the buffer, robotic device, etc.). When the battery is charged (e.g., the battery level is above a threshold), the controller 8 can send a signal to the connector to automatically disconnect the device. In some embodiments, the winding of the linear element by the spool 2 can be sufficient to automatically apply a force to the connector to disconnect the connector from the electrical device. In some embodiments, the controller 8 can wirelessly monitor a battery level of the electrical device (e.g., buffer, robotic device, etc.). If the battery level is too low (e.g., the battery level is below a battery level threshold), the controller 8 can send an alert signal to the user to indicate that the device should be charged. In some embodiments, the controller 8 can send an alert signal to cause the linear element (e.g., electrical cord) to unwind from the spool 2 to charge the device's battery. The controller 8 can accurately unwind the linear element to the desired location of the device to be charged. In some embodiments, a robotic service device can automatically move the end of the linear element to the device and connect the linear element to the device, e.g., by way of the magnetic or electromagnetic connector. Beneficially, the electrical device (e.g., buffer, robotic device, etc.) can operate continuously without being required to stop operations to recharge the battery.

Figure 4:
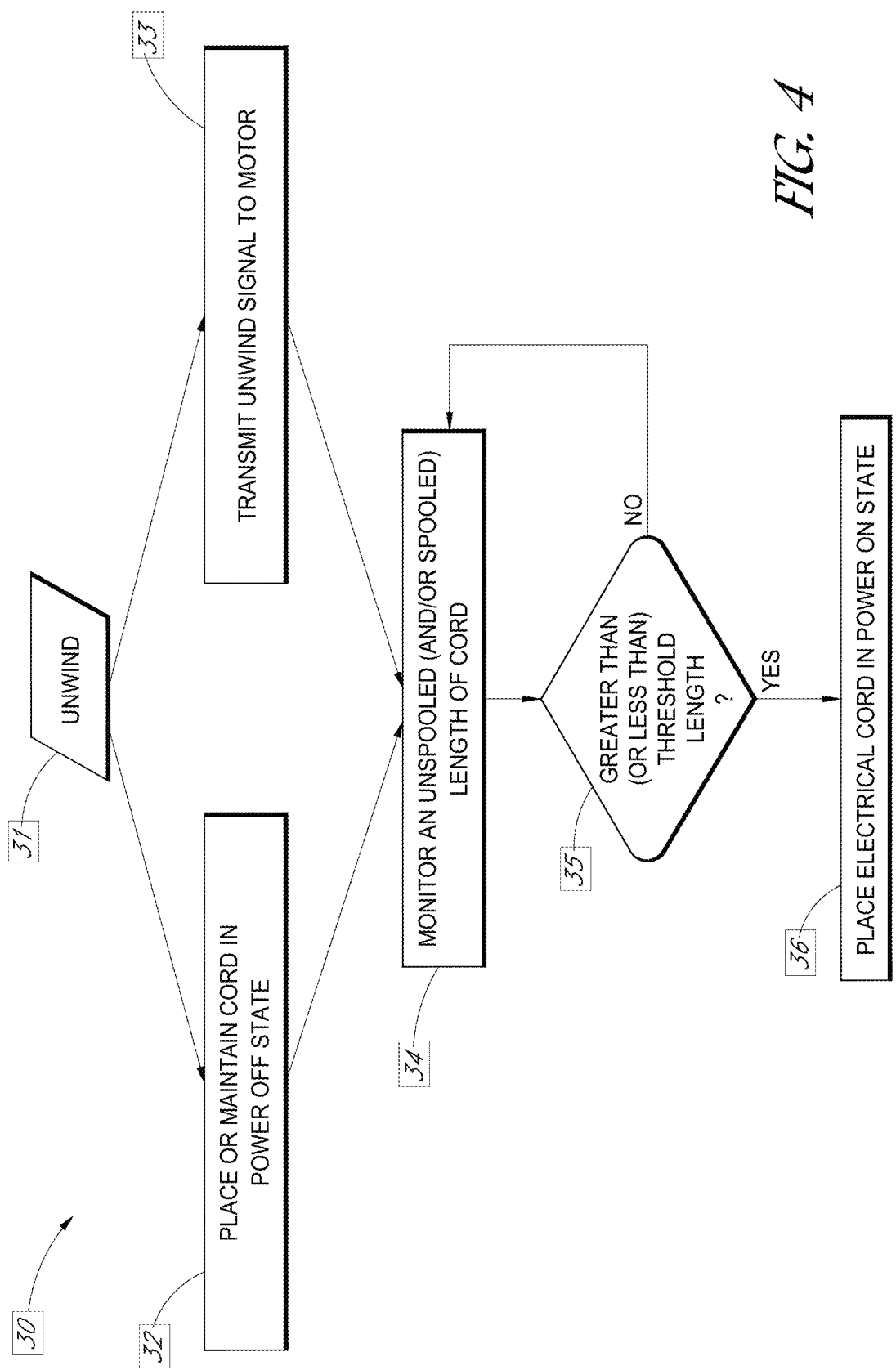
FIG. 4 is a flowchart illustrating a method of controlling winding and unwinding of an electrical cord, according to one embodiment.

FIG. 4 illustrates an example method 30 of controlling a reel assembly, according to various embodiments. In various embodiments, a user can engage with the remote control 10 (or other user interface) to initiate an unwind command 31. As explained herein, in various embodiments the remote control 10 can wirelessly communicate with the controller 8, and can be untethered to the other components of the reel assembly 1 such as the controller 8, motor 9, or spool 2. Some other reel assemblies may include spools that are hard-wired to the reel assembly, such that an electrician may need to be hired for installation and maintenance or replacement of the reel assemblies. In response to the unwind command, the method 30 moves to a block 32, in which the controller 8 can place or maintain the electrical cord 3 in a power off state. In the power off state, the electrical cord 3 does not generate significant heat, which maintains the cord 3 at an acceptable temperature below the threshold temperature. Further in response to the unwind command, the method 30 moves to a block 33, in which the controller 8 can transmit an unwind signal to the motor 9 to cause the motor 9 to unwind the electrical cord 3 from the spool 2 by rotating the spool 2 in a first direction, as shown in FIGS. 1A-1D and 2B-2C. The motor 9 can accordingly drive the cord 3 from the spool 2 in some embodiments. In some embodiments, gravity can assist in pulling the cord 3 from the spool 2. Thus, while the cord 3 is being unwound initially, the cord 3 can be maintained in a power off state, which will keep the cord 3 at an acceptable temperature during unwinding, until a sufficient length of cord 3 has been unwound and the cord 3 can be safely turned on. In some embodiments, the method 30 of FIG. 4 can be used in conjunction with the one or more temperature sensors to provide redundant mechanisms by which the temperature of the cord 3 may be maintained at or below the threshold temperature (for example, to comply with standards, such as UL certification standards).

The method 30 moves to a block 34 in which, during the unwinding, the controller 8 can monitor an amount of rotation of the spool 2 in order to track the unspooled length $L_U$ (or alternatively, the spooled length $L_S$) of the electrical cord 3 that has been unwound from (or, alternatively, wound about) the spool 2. For example, in various embodiments, a Hall effect sensor connected to the motor 9 or another type of sensor can be used to monitor the length of the cord 3 that has been unwound around the spool 2 at a particular moment. In some embodiments, the Hall effect sensor can monitor the amount of rotation of the spool 2 based at least in part on an amount of rotation of a magnet on the motor 9, or on a flange or other component that rotates with the spool 2. For example, the Hall effect sensor can monitor a number of turns (whole and/or fractional turns) of the spool 2 during unwinding and winding. If the length $L_U$ of cord 3 that has been unwound around the spool 2 is less than a threshold length (which may correspond to $L-L_T$), the controller 8 can maintain the cord 3 in the power off state so as to maintain the temperature of the cord 3 at an acceptable level. Alternatively, if the length $L_S$ that is wound around the spool 2 is greater than the threshold temperature length $L_T$, the controller 8 can maintain the cord 3 in the power off state. However, if the length $L_U$ of the cord 3 that has been unwound from the spool 2 is greater than or equal to the threshold length (e.g., $L-L_T$), the controller 8 can automatically place the electrical cord 3 in a power on state. Alternatively, if the length $L_S$ that is wound around the spool 2 is less than or equal to the threshold temperature length $L_T$, the controller 8 can automatically place the electrical cord 3 in a power on state. Since the spool length $L_S$ of cord 3 that remains around the spool is less than or equal to the threshold temperature length $L_T$, the cord 3 can be powered on while maintaining the temperature of the cord 3 at suitable temperature levels.

Thus, in various embodiments, the controller 8 can be configured to automatically place the electrical cord 3 in a power on state based at least in part on an amount of rotation of the spool 2 during the unwinding. The amount of rotation of the spool 2 may be based, in turn, on an amount of rotation of a magnet of the motor 9 (or other rotating component) which can be monitored by the Hall effect sensor or other type of sensor. In various embodiments, the controller 8 can be configured to continue transmitting the unwind signal to the motor 9 after the electrical cord 3 is placed in the power on state. In some embodiments, when the spool length meets or exceeds a second threshold length, the controller 8 can be configured to transmit an unwind termination signal to the motor 9 to cause the motor 9 to stop unwinding the electrical cord 3 from the spool 2. Thus, in some embodiments, the controller 8 can automatically stop the motor 9 from unwinding when a desired length of cord 3 is unwound from the spool 2. The controller 8 can also automatically stop the unwinding, for example, based on a minimum spool length $L_S$ of cord 3 about the spool 2. It may be beneficial to maintain a minimum spool length $L_S$ (e.g., one, two, three, four turns, etc.) about the spool 2 to provide a strain relief feature to prevent the cord 3 or other linear element from disconnecting from the spool 2. In some embodiments, the controller 8 can send instructions to the motor to decelerate the unwinding gradually, as opposed to an abrupt stop. For example, the assembly 1 can be programmed to gradually decelerate the unwinding when the cord 3 is unwound by a certain amount so as to reduce sway or swinging of the cord 3, which can damage the reel assembly 1 or nearby external components. After the gradual deceleration, the unwinding can be stopped.

In some embodiments, in response to a stop unwind command (for example, transmitted by the remote control 10), the controller 8 can be configured to transmit an unwind termination signal to the motor 9 to cause the motor 9 to stop unwinding the electrical cord 3 from the spool 2. In such embodiments, the user can control when the cord 3 stops unwinding from the spool 2.

Embodiments disclosed herein can also automatically wind the cord 3 back in over the spool 2. In various embodiments, in response to a wind command (for example, transmitted by the remote control 10), the controller 8 can be configured to transmit a wind signal to the motor 9 to cause the motor 9 to reverse direction so as to rotate about a second direction to wind the electrical cord 3 about the spool. In some embodiments, in response to the wind command, the controller 8 can automatically place the cord 3 in the off state. In some embodiments, the controller 8 can be configured to automatically place the electrical cord 3 in a power off state based at least in part on a second amount of rotation of the spool during the winding in the second direction, which may be based on a length of the cord 3 that has been wound back in over the spool 2. For example, if the total spooled length $L_S$ of cord 3 wound around the spool 2 approaches the threshold temperature length $L_T$, the controller 8 can place the electrical cord 3 in the power off state before the threshold temperature length $L_T$ of cord 3 is wound about the spool 2. The controller 8 can also be configured to automatically transmit a wind termination signal to the motor to cause the motor 9 to stop winding the electrical cord 3 around the spool 2. Additionally or alternatively, the user can engage with the remote control 10 to manually stop winding.

As explained herein, in various embodiments, the reel assembly 1 can be configured to mount to a structure (such as a ceiling) that is elevated above a surface (such as the ground, a table, etc.). When the winding of the cord 3 or other linear element is initiated, there may be a significant length of the unwound linear element laying on the surface (e.g., the floor or ground). For example, during use of an electrical cord 3, the user may have unwound a substantial working length that lies on the ground during use. When the winding is commenced, the length of the unwound cord 3 along the ground may swing or sway in the opposite direction as the unwound cord 3 is lifted off the ground. The swinging or swaying can occur at any speed and acceleration if the winding continues so as to lift the cord 3 off the ground. In some cases, such swaying or swinging may cause injury to bystanders and/or may damage other neighboring equipment or components. For example, in some types of linear elements (such as mechanical cables), a heavy hook or other device may be attached to the distal end of the linear element. As another example, for electrical cords, heavy junction boxes or other components may be connected to the distal end of the cord 3. The use of heavy devices and/or devices with sharp corners at the distal end of the linear element may exacerbate the damage caused by swinging or swaying to neighboring components and/or injury to bystanders.

Beneficially, in various embodiments, the controller 8 may be programmed such that, upon initiation of winding, the linear element is gradually accelerated so that any unwound linear element laying along the floor or ground is gradually wound in along the floor or ground (or any other surface that the linear element could rest upon, such as a table, vehicle, train, building, etc.). For example, the controller 8 can be programmed with motor instructions that include first acceleration instructions to, upon initiation of winding, increase motor speed at a first rate for a first duration. The controller 8 may be further programmed such that, after the gradual acceleration, the motor 9 gradually decelerates and halts winding for a duration sufficiently long so as to halt the momentum of the linear element and reduce the risk of swaying or swinging of the linear element. For example, after the gradual acceleration and deceleration of the initial wind-in, the motor 9 can briefly pause the winding. The motor speed instructions can therefore include motor stop instructions to stop the motor for a second duration when the distal end of the linear element is positioned at a location just prior to lifting off the ground (e.g., in a range of 0.1 ft to 3 ft from lifting off the ground, or in a range of 0.1 ft to 1 ft from lifting off the ground). In some embodiments, the gradual acceleration and deceleration may be stopped at or near the location at which the distal end of the linear element is directly below the reel assembly 1 (or at a location just prior to the distal end lifting off the ground or other surface). After pausing or halting the winding, the controller 8 can be programmed to instruct the motor 9 to accelerate to continue winding until the distal end of the linear element is near the spool 2, at which point the motor 9 can decelerate the winding until the linear element is docked. Thus, various embodiments disclosed herein can obviate the problems associated with swaying or swinging of the distal end of the linear element prior to liftoff from the ground. For example, the motor instructions can include second acceleration instructions to increase motor speed at a second rate for a second duration, with the second rate higher than the first rate. In various embodiments, the motor instructions can include a gradually increasing motor acceleration that reaches an approximately constant acceleration, until the cord reaches the docking point when the motor decelerates until the distal end of the linear element is docked at the spool 2. In some embodiments, the controller 8 can also be programmed to send instructions to the motor to decelerate the winding gradually, as opposed to an abrupt stop and/or hard landing, so as to avoid whipping the cord around during docking which can damage the reel assembly 1, the cord 3 and/or nearby external components. Thus, in various embodiments, the controller 8 can be programmed to have variable speeds, acceleration and/or deceleration, e.g., slowing down to eliminate or reduce the swaying and swinging of the linear element (e.g., cord or cable), and/or stopping the wind to eliminate or reduce the swaying and swinging.

Embodiments disclosed herein can be used with reel assemblies 1 that include any suitable type of linear element, such as an electrical cord, a water hose, an air hose, a transmission fluid hose, an oil hose, a mechanical cable (e.g., a metal or steel cable), a communications cable (such as an Ethernet cable, CAT5 cable, etc.), or any other suitable type of windable and unwindable linear element. It can be important to monitor an amount of unwinding and winding so that the user knows how much of the linear element is wound around the spool 2 (e.g., for maintaining safe temperatures, etc.) and/or unwound from the spool 2. For example, as explained above, it can be beneficial to monitor the length of cord 3 wrapped around the spool 2 to maintain the reel assembly 1 at safe temperatures. Moreover, embodiments disclosed herein can use a wireless remote control, which can be easier to install and operate as compared to other hardwired systems that do not utilize a remote control. It may also be beneficial in other applications that utilize linear elements other than electrical cords to monitor and control winding and unwinding. Accordingly, there is a continuing need for improved automatic winding and unwinding control of linear elements.

In addition, in some embodiments, the linear element can be elevated above the surface and may remain suspended above the surface. In such embodiments, the controller can be configured to monitor an amount of winding and unwinding of the linear element so as to control the length, velocity, and/or acceleration of the linear element. For example, in various embodiments, the controller 8 can be configured to cause the motor to unwind by an amount to position the distal end of the linear element above the surface (e.g., above the ground) by a predetermined distance (e.g., by a distance in a range of 0.5 feet to 25 feet above the ground, etc.). In various embodiments, the controller 8 can cause the unwinding to decelerate before the distal end of the linear element is above the surface by the predetermined distance. The deceleration can reduce the velocity of the distal end such that the distal end does not damage any external components or cause any injuries during unwinding. In addition, as explained herein, the controller 8 can cause the motor to wind in the linear element and, at a predetermined distance below the spool 2, cause the motor 9 to decelerate before the linear element is fully docked at the spool 2.

Figure 5:
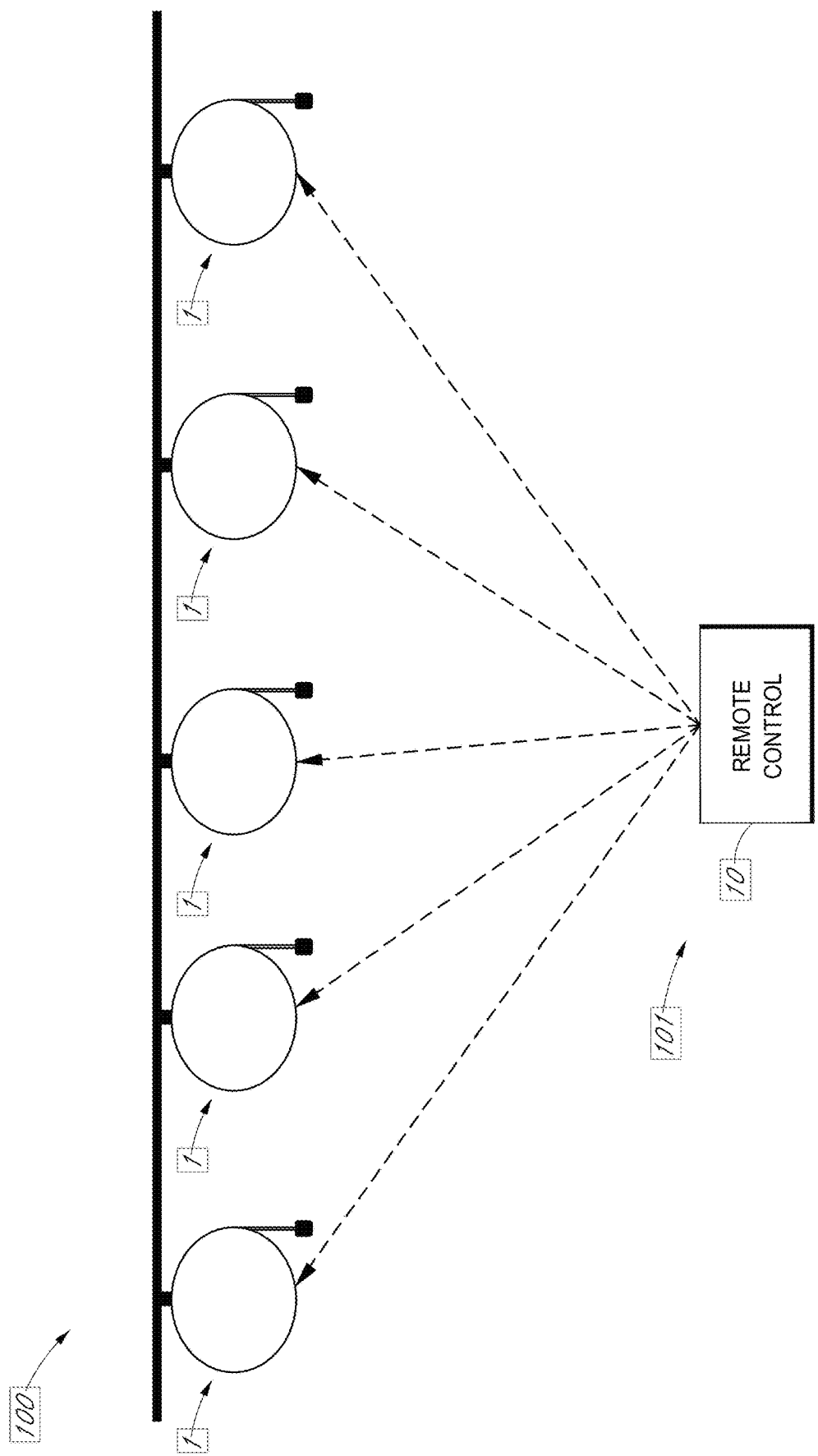
FIG. 5 is a schematic system diagram of a reel system according to various embodiments.

Turning to FIG. 5, in some embodiments, a reel system 100 can include a plurality of reel assemblies 1 that can operate in a manner similar to that described herein with respect to FIGS. 1-4. For example, in buildings or structures, such as aircraft hangars, garages, etc., there may be a demand for using numerous reels to simultaneously or separately work on different aircraft, vehicles, or other machines. Beneficially, the system 100 and assemblies 1 disclosed herein can include a master control system 101 that includes a remote control 10 in wireless communication with the controller 8 of each reel assembly 1 of the plurality of reel assemblies 1. The master control system 101 can be configured to control the operation of the plurality of reel assemblies. For example, the master control system 101 can transmit an unwind command to one or more reel assemblies 1 of the plurality of reel assemblies 1. In response to the unwind command, the controller 8 of each of the one or more (or all of) reel assemblies can be configured to transmit an unwind signal to the motor 9 to cause the motor 9 to unwind the linear element (e.g., cord 3) from the spool 2. In some embodiments, the controller 8 can send a wind command to one or more (or all) reel assemblies to cause the motor 9 to wind the cord 3 about the spool 2. In some embodiments, the system 100 can include a second plurality of reel assemblies 1. The system 100 can separately control the second plurality of assemblies 1 in some embodiments.

The remote control 10 can be used with any suitable wireless communications platform and any suitable type of electronic device. For example, the master control system 101 and/or remote control 10 can comprise a portable electronic device (such as a smartphone, tablet computer, laptop computer, touchscreen display, or the like). The remote control 10 can operate over WiFi, Bluetooth, 4G or 5G networks, etc. In other embodiments, the remote control 10 can be hardwired to the reel assemblies 1. The master control system 101 and the controllers 8 disclosed herein can include one or more processors and memory devices. The memory devices (such as RAM, flash memory, or any suitable computer-readable medium) can include instructions stored thereon that, when executed by a processor, perform the enumerated functions.

Beneficially, the user can control the winding and unwinding of the reel assemblies 1 in accordance with any of the embodiments disclosed herein. For example, the user can engage the master control system 101 to send control instructions to one or more of the reel assemblies 1 that include cord reels to initiate an unwind command and can monitor the length of cord 3 being unwound. As explained above, the controller 8 of each reel assembly 1 can automatically place the reel assembly 1 in the on state based on a monitored amount of rotation of each reel assembly 1, as explained above in connection with FIGS. 1-4. As above, the master control system 101 can instruct the controller 8 of each reel assembly 1 to wind the cord 3 back over the spool 2 and to place the cord 3 in the off state based on a second monitored amount of rotation.

As explained above, other types of linear elements can be used in the system 100 as explained above. Moreover, the user can engage with the master control system 101 to individually address a single specific reel assembly 1 of the plurality of assemblies 1 without sending instructions to the other reel assemblies. In other embodiments, the master control system 101 can be configured to simultaneously address all or a subset of the plurality of reel assemblies 1. In still other embodiments, the system 100 can include a first group of one or more reel assemblies 1 and a second group of one or more reel assemblies 1. The master control system 101 can be configured to separately or simultaneously address the first and second groups.

Figure 6:
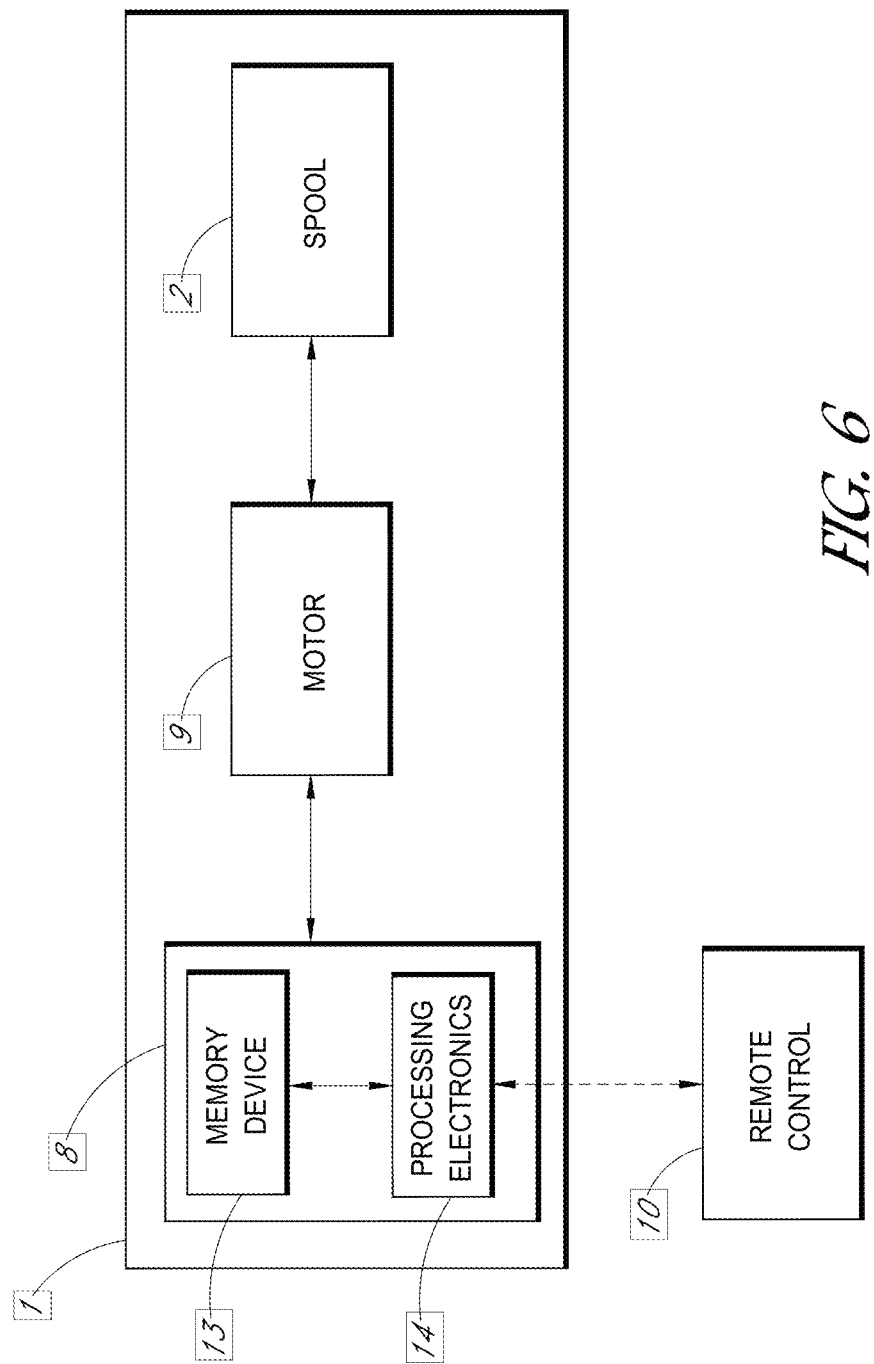
FIG. 6 is a schematic system diagram of a reel assembly according to various embodiments.

FIG. 6 is a schematic system diagram of a reel assembly 1, according to various embodiments. Unless otherwise noted, the components of FIG. 6 may be the same as or generally similar to like-numbered components of FIGS. 1A-5. The assembly 1 of FIG. 6 can be used in combination with any of the embodiments disclosed herein. As shown in FIG. 6, the reel assembly 1 can include a programmable controller 8 in electrical communication with the motor 9. The controller 8 can include processing electronics 14 and a memory device 13 for storing instructions executable by the processing electronics 14. The processing electronics 14 can comprise any suitable combination of one or more processors, such as central processing units (CPUs), application specific integrated circuits (ASICs), communications chips (such as wireless communications chips), field programmable gate arrays (FPGAs), or any other suitable processing devices. The processing electronics can be configured to process instructions stored on the memory device 13 (or any other associated memory devices). The processing electronics 14 can also be configured to transmit and/or receive data wirelessly from the remote control 10, and/or from other components (e.g., a central server over the Internet or local area network). The memory device 13 can comprise any suitable type of non-transitory computer readable medium, such as one or more random access memory (RAM) devices, one or more flash memory devices, etc.

Beneficially, in various embodiments, the user can program the controller 8 to automatically unwind and/or wind the linear element (e.g., the cord 3 or other type of linear element, such as a mechanical cable, a hose, etc.) from the spool 2. For example, the user can store a first length of linear element to be unwound from the spool 2 at a first time. As an example, the user may want to unwind an electrical cord from a ceiling of an aircraft hangar at a particular time and to a particular length. The memory device 13 can store the desired unwinding time and the desired unwinding length, and the processing electronics 14 can be configured to automatically transmit an unwind signal to the motor 9 at the first time to cause the motor 9 to unwind from the spool 2 a first length of the linear element stored in the memory device 13. The processing electronics 14 can be configured to automatically transmit an unwind termination signal to the motor 9 based on an amount of rotation of the spool 2, such that the desired unwinding length is unwound from the spool 2.

Similarly, the user may desire to wind the linear element back in at a second time of the day and by a second winding length. The second time and the second winding length can be stored in the memory device 13. The processing electronics 14 can be configured to automatically transmit a wind signal to the motor 9 at the second time to cause the motor 9 to wind about the spool 2 the second length of the linear element stored in the memory device 13. The processing electronics 14 can be configured to automatically transmit a wind termination signal to the motor 9 based on an amount of rotation of the spool 2, such that the desired winding length is wound about the spool 2.

In various embodiments, the user can also program a desired motor speed profile (in the form of motor speed instructions) so as to control the velocity and/or acceleration of a portion of the linear element. For example, it may be desirable to control the velocity and/or acceleration of the interface member 4 (e.g., plug) during winding and/or unwinding so as to reduce swinging and/or swaying, as described above. In some embodiments, the user can store a qualitative or quantitative amount of deceleration during winding and/or unwinding. For example, the user can store in the memory device 13 qualitative instructions that the linear element should be unwound and/or wound at a constant speed of low, medium, or high (or any number of increments therebetween). In other embodiments, the user can store specific quantitative instructions related to motor or spool rotational speed. The user can additionally or alternatively store instructions in the memory device 13 regarding the acceleration of the portion of the linear element. For example, the user can program the controller 8 to decelerate during docking at the end of a winding operation, and/or to decelerate during deployment at the end of an unwinding operation. The processing electronics can be configured to automatically transmit a motor speed signal to the motor based at least in part on the motor speed instructions stored in the memory device.

As explained above, a sensor (such as a Hall effect sensor) can be used to monitor an amount of rotation of the spool 2 to determine rotational position or orientation data. As explained above, the sensor can monitor the number of turns (whole or fractional) or degrees by which the spool 2 (and/or a motor shaft of the motor 9) has turned in order to monitor the length of linear element wound or unwound from the spool 2. The controller 8 can determine the angular velocity and/or acceleration of the spool 2 and/or motor shaft based on the measured rotational position data. The determined angular velocity and/or acceleration can be used to assist in controlling the velocity and/or acceleration during winding and/or unwinding. For example, feedback control methods (such as closed loop proportional-integral-derivative, or PID, control techniques, or open loop techniques) can be used to adjust the motor speed as instructed by the user.

The user can store the instructions in the memory device 13 by way of any suitable user interface. For example, in the illustrated embodiment, the user can store the instructions using the remote control 10, which can wirelessly transmit the instructions to the controller 8 for storing in the memory device 13. In other embodiments, the user can store the instructions using an interface hard wired to the reel assembly 1 (or nearby the reel assembly 1).

As explained above, the embodiment of FIG. 6 can be used in combination with any of the other embodiments disclosed herein. For example, as explained above in connection with FIGS. 1A-4, the linear element can comprise an electrical cord. In such embodiments, the controller 8 can automatically instruct the motor 9 to unwind the cord 3 based on user instructions stored in the memory device 13. During the initiation of unwinding, the controller 8 can place or maintain the cord 3 in the power off state. As explained above, once a sufficient length of cord 3 has been unwound from the spool 2 (e.g., exceeding a threshold length), the cord 3 can be placed in the power on state. Similarly, the controller can automatically instruct the motor 9 to wind the cord 3 based on user instructions stored in the memory device 13. The cord 3 may be placed in the power off state when the amount of cord 3 wound about the spool 2 is less than or equal to the threshold temperature length $L_T$.

Figure 7:
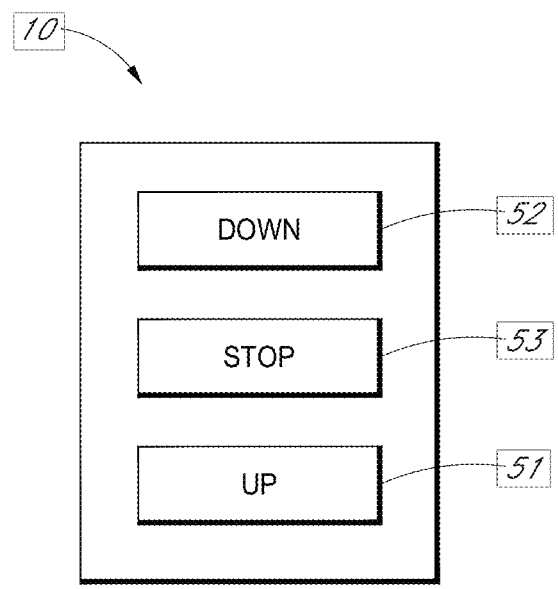
FIG. 7 is a schematic diagram of a remote control, according to various embodiments.

FIG. 7 is a schematic diagram of a remote control 10, according to various embodiments. The remote control 10 can be used in combination with any of the embodiments disclosed herein. In the illustrated embodiment, the remote control 10 can comprise three buttons, including an up button 51 (or a "wind in" button), a down button 52 (or a "wind out" button), and a stop button 53. As explained above, the remote control 10 can be in wireless communication with the system 100 and/or the reel assemblies 1. The up button 51 can be engaged to send instructions to the controller 8 to cause the motor 9 (e.g., a solenoid of the motor 9) to rotate in a direction that winds in the linear element. In some embodiments, such as those in which the reel assembly 1 is mounted to the ceiling, the motor 9 can rotate in a direction that winds the linear element upwardly towards the ceiling. Similarly, the down button 52 can be engaged to send instructions to the controller 8 to cause the motor 9 (e.g., a solenoid of the motor 9) to rotate in a direction that unwinds or winds out the linear element. In some embodiments, such as those in which the reel assembly 1 is mounted to the ceiling, the motor 9 can rotate in a direction that unwinds the linear element downwardly away from the ceiling. Thus, in various embodiments, the user can issue a command by engaging the motor 9 to wind in and/or wind out the linear element by a desired amount. In addition, as shown in FIG. 7, the stop button 53 can be engaged or depressed to stop the motor 9 from rotating. Thus, the stop button 53 can be depressed to stop the motor 9 from winding in the linear element and/or from winding out the linear element. In various embodiments, the remote control 10 may include only the three buttons shown in FIG. 7. In other embodiments, the remote control 10 can include additional buttons, such as, for example, a power on/off button. As explained herein, the remote control 10 can comprise any suitable type of electronic device, including a mobile electronic device such as a table computing device, a smartphone, a laptop computer, etc. In some embodiments, as explained above, the reel assembly 1 can be individually and separately addressable from other reel assemblies in the system. The remote control 10 can be configured to separately control the reel assembly 1 to cause it to reel in, reel out, and/or stop reeling. In some embodiments, the remote control 10 can be configured to simultaneously control multiple reel assemblies 1 of the system to, e.g., cause multiple reel assemblies to simultaneously (or sequentially) reel in, reel out, and/or stop reeling.

Although the remote control 10 of FIG. 7 includes three buttons, in other embodiments, the remote control 10 can comprise only one button. Such a single-button remote can comprise a simpler design that is user-friendly and intuitive to use. The single-button remote can be programmed to control the reel assembly 1 based at least in part on the number of times the user depresses the button. For example, the remote control 10 can be configured to send a first signal to the controller 8 to instruct the motor 9 to rotate the spool 2 to wind the linear element about the spool 2 when the user depresses the button a first number of times, the remote control 10 configured to send a second signal to the controller 8 to instruct the motor 9 to rotate the spool 2 to unwind the linear element from the spool 2 when the user depresses the button a second number of times. In various embodiments, the first number can be different from the second number. The remote control 10 can be configured to stop winding or unwinding of the linear element when the user depresses the button a third number of times. One of the first number and the second number is one, and wherein the other of the first number and the second number is two. As noted above, the button can be the only button on the remote control.

By way of example, in some embodiments, the button can be pressed once to cause the linear element to unwind from the spool 2, and the user can depress the button twice in a row to cause the linear element to wind onto the spool 2, or vice versa. In various embodiments, if the linear element is winding or unwinding, the user can depress the button once to stop the winding or unwinding, and can depress the button twice to continue the winding or unwinding. Alternatively, if the linear element is winding or unwinding, the user can depress the button twice to stop the winding or unwinding, and can depress the button once to continue the winding or unwinding. Skilled artisans will appreciate that the remote control 10 can be configured to stop and/or start winding or unwinding based on any suitable number of times that the user depresses the button on the remote control 10.

In other embodiments, the remote control 10 of FIG. 7 can include a first button for winding, a second button for unwinding, a third button that sets a docking point of the linear element when the linear element is being docked or stored, and a fourth button that sets an operational or set position for use of the linear element during operation. Skilled artisans would understand that additional or fewer buttons can be used on the remote control 10. The first and second buttons can comprise start-and-stop type buttons in which the user can engage the first button in one instance to cause the linear element to wind back in and to engage the first button in another instance to cause the linear element to stop winding back in. The user can engage the second button in one instance to cause the linear element to unwind and to engage the second button in another instance to cause the linear element to stop unwinding. The user can engage or depress the third button to program a docking location (location of the end of the linear element when the end approaches a storage location) for the linear element. For example, the user can depress the third button to program the reel assembly such that, when the end of the linear element reaches a desired docking or storage location during winding (e.g., after depressing the first button to initiate winding), the motor 9 decelerates, which, as explained herein, can prevent a whipping action as the linear element lifts off the ground and is brought back to the reel assembly 1. The fourth button can be depressed to program a set point or operational location (location of the end of the linear element during use of the reel assembly). For example, the user can program an operational location of the reel assembly by unwinding the linear element to a desired location (e.g., a desired height above the ground). When the end of the linear element is at the desired location for operational use, the user can depress the fourth button to program the reel assembly. In use, the user can deploy the linear element by depressing the second button to unwind the linear element. Based on the set point programmed by the user, when the end of the linear element reaches the set point, the motor 9 can decelerate so as to smoothly cause the linear element to stop unwinding.

Figure 8:
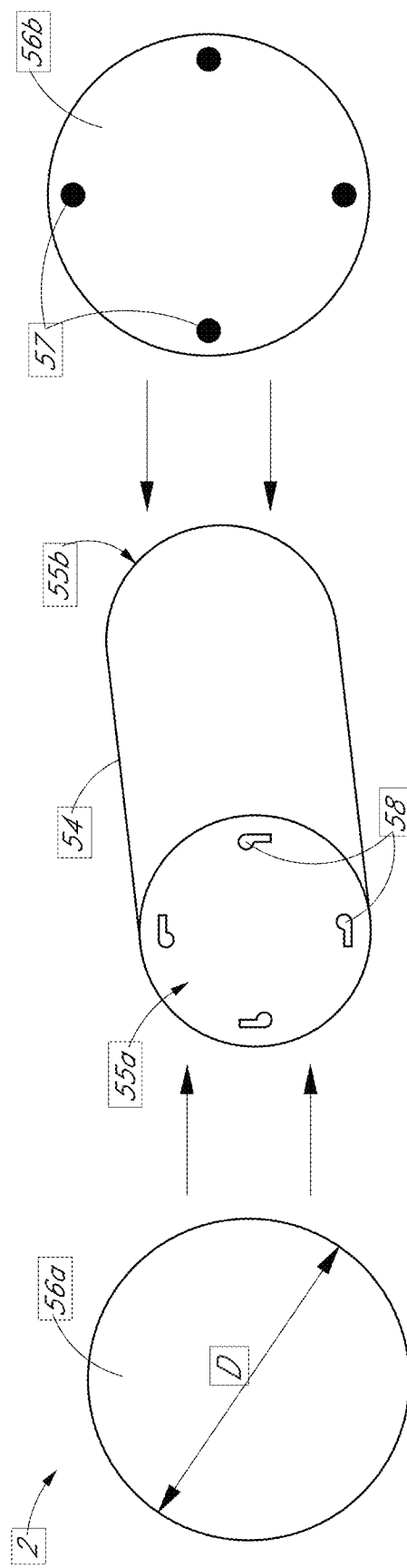
FIG. 8 is a schematic perspective view of a spool that includes a hub about which the linear element can be wound and/or unwound, and a pair of flanges attachable to opposing ends of the hub.

FIG. 8 is a schematic perspective view of a spool 2 that includes a hub 54 about which the linear element can be wound and/or unwound, and a pair of flanges 56a, 56b attachable to opposing ends 55a, 55b of the hub 54. The spool 2 can be used to support linear elements having different lengths. For example, some users may want to use a 30' long linear element, while other users may want to use a 50' or 100' long linear element. Beneficially, the spool 2 of FIG. 8 can utilize a common hub 54 to support linear elements of different sizes.

As shown in FIG. 8, a first flange 56a can be attached to a first end 55a of the hub 54, and a second flange 56a can be attached to a second end 55b of the hub 54 that is opposite the first end 55a. Each of the first and second ends 55a, 55b can include alignment feature(s) comprising one or a plurality of alignment holes 58 (e.g., keyholes) spaced apart along a circumference or periphery of the ends 55a, 55b of the hub 54. The flanges 56a, 56b can include a corresponding alignment feature(s) comprising one or a plurality of projections 57 extending outwardly from the flanges 56a, 56b. The user can removably and/or tool-lessly connect the flanges 56a, 56b to the respective ends 55a, 55b of the hub 54. For example, the user can insert the projection(s) 57 into the corresponding alignment hole(s) 58 of the hub 54 and rotate the flanges 56a, 56b relative to the hub 54 to secure the flanges 56a, 56b to the opposite ends 55a, 55b of the hub 54. In some embodiments, the flanges 56a, 56b can be removable from the hub 54, e.g., the user can rotate the flanges 56a, 56b in an opposite direction and withdraw the projection(s) 57 from the alignment hole(s) 58 to remove the flanges 56a, 56b from the hub 54.

The flanges 56a, 56b can have a diameter D or width suitable for use with winding and/or unwinding a linear element having a length in a predetermined range. For example, larger flanges may be suitable for controlling the winding and unwinding of linear elements that are longer than those used with smaller flanges. In various embodiments, the hub 54 can be connectable to flanges 56a, 56b having a variety of different diameters and sizes, and can accordingly be used to support linear elements having different lengths. As an example, the user may elect to use a 20' linear element (e.g., hose, electrical cord, etc.), and can attach flanges 56a, 56b having a first diameter $D_1$ to the hub 54 that is sufficient for controlling the winding and unwinding of the 20' linear element. As another example, the user may elect to use a 100' linear element and can attach flanges 56a, 56b having a second diameter $D_2$ that is larger than the first diameter $D_1$ and sufficient for controlling the winding and unwinding of the 100' linear element. Thus, the hub 54 can be used with flanges 56a, 56b having different sizes selectable for linear elements having different lengths. In various embodiments, the hub 54 can be packaged and configured with flanges 56a, 56b having different diameters.

Figure 9A:
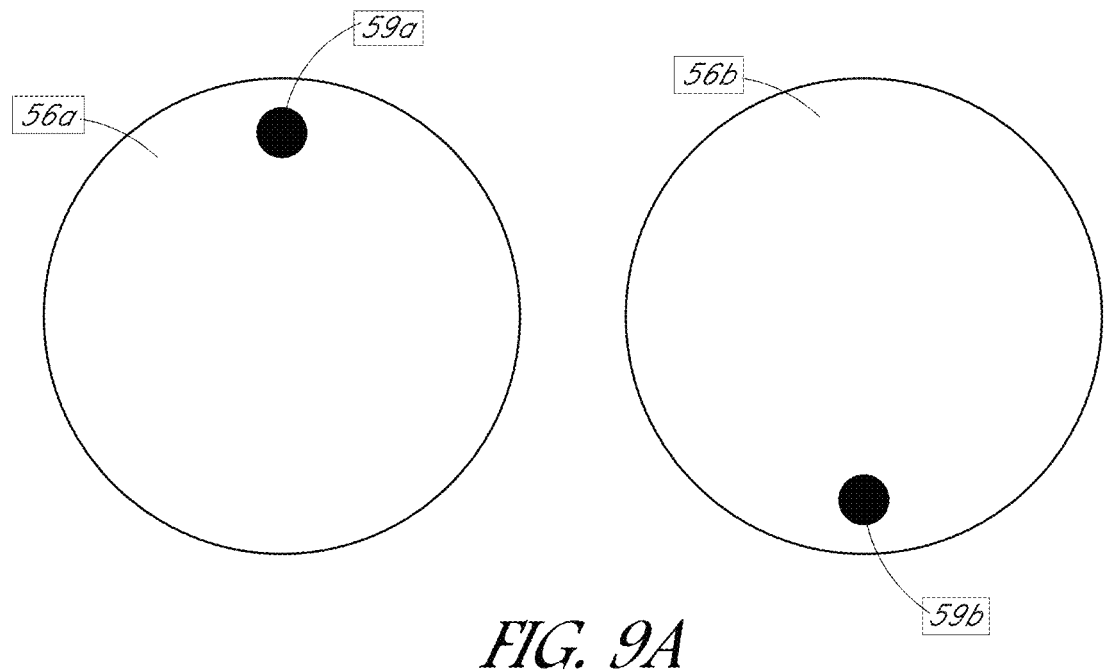
FIGS. 9A-9B illustrate an embodiment of flanges of a spool configured to provide uniform winding and/or unwinding of a linear element about the spool.
Figure 9B:
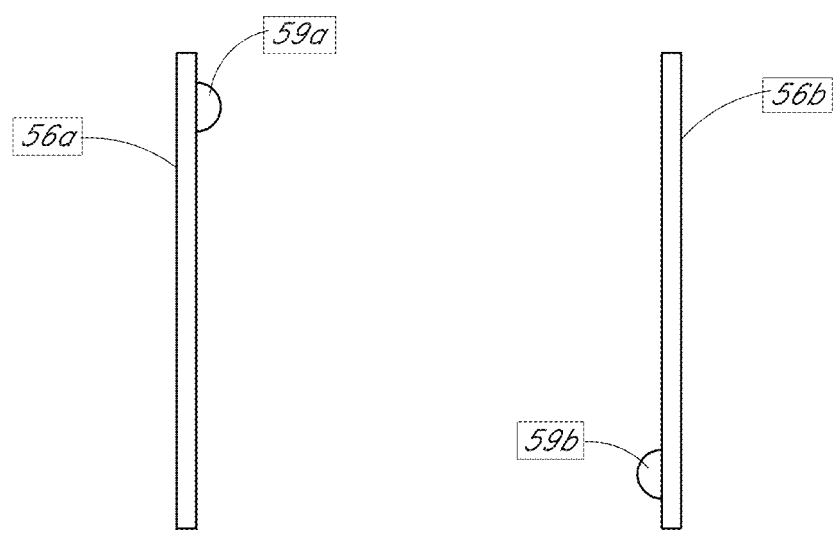

FIGS. 9A-9B illustrate an embodiment of flanges 56a, 56b of a spool 2 configured to provide uniform winding and/or unwinding of a linear element about the spool 2. The flanges 56a, 56b can be used in conjunction with any of the spools 2 and reel assemblies disclosed herein. During winding of a linear element (such as a hose, cord, etc.), the linear element may be wound back in over the hub 54 in a non-uniform manner, which may be undesirable. As shown in FIGS. 9A-9B, each flange 56a, 56b can include a guide bump 59a, 59b, respectively, to assist in maintaining uniform spooling of the linear element about the hub 54 during winding. As explained in FIG. 8, the flanges 56a, 56b can be attached to the hub 54, and therefore, rotate with the hub 54 during winding and unwinding. The bumps 59a, 59b can be provided at opposite end portions of the flanges 56a, 56b. For example, the bumps 59a, 59b can be circumferentially offset relative to one another, e.g., by about 180°.

The bumps 59a, 59b can gradually curve or taper inwardly from the flanges 56a, 56b as shown in FIG. 9B. In some embodiments, the bumps 59a, 59b can extend inwardly by a length in a range of 0.1" to 0.5", e.g., about 0.25" or 0.375". As the hub 54 and flanges 56a, 56b are rotated during winding of the linear element, the linear element may wind progressively about the hub 54 in a lateral manner. When the linear element contacts the bump 59a at one end of the hub 54 on flange 56a, the bump 59a may urge the linear element back towards the opposite end of the hub 54 and the flange 56b. When the linear element contacts the bump 59b at the opposite end of the hub 54 and the flange 56b, the bump 59b may urge the linear element back towards the flange 56a. The bumps 59a, 59b can accordingly serve as a passive winding assistance device to provide uniform winding and unwinding. Spacing the bumps 59a, 59b apart by about 180° can help maintain uniformity.

Having thus described various embodiments, those of skill in the art will readily appreciate from the disclosure herein that yet other embodiments may be made and used within the scope of the embodiments attached hereto. For example, although the illustrated embodiments relate to linear elements that comprise electrical cords, in other embodiments, the reel assembly may be used with various other types of linear elements, such as water hoses, air hoses, pressure washer hoses, vacuum hoses, electrical cords, and the like. Numerous advantages of the embodiments covered by this disclosure have been set forth in the foregoing description. It will be understood however that this disclosure is, in many respects, only illustrative. Changes may be made in details without exceeding the scope of the disclosure.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An electrical cord reel assembly comprising:
   a spool configured to wind and unwind an electrical cord therefrom;
   a motor configured to rotate the spool to wind and unwind the electrical cord about the spool; and
   a controller in electrical communication with the motor and the electrical cord, wherein the controller is configured to:
      in response to an unwind command, place or maintain the electrical cord in a power off state;
      in response to the unwind command, transmit an unwind signal to the motor to cause the motor to unwind the electrical cord from the spool; and
      automatically place the electrical cord in a power on state based at least in part on an amount of rotation of the spool during the unwinding.

2. The electrical cord reel assembly of claim 1, wherein the controller is configured to automatically place the electrical cord in the power on state if the amount of rotation of the spool exceeds a threshold number of turns during the unwinding.

3. The electrical cord reel assembly of claim 1, wherein the controller is configured to:
   during the unwinding, monitor an unspooled length of the electrical cord that has been unwound from the spool during the unwinding; and
   when the unspooled length is greater than or equal to a threshold length, place the electrical cord in the power on state.

4. The electrical cord reel assembly of claim 3, wherein the controller comprises a memory device, the threshold length programmably storable on the memory device.

5. The electrical cord reel assembly of claim 1, wherein the controller is configured to:
   during the unwinding, determine a spooled length of the electrical cord that is wound around the spool during the unwinding; and
   when the spooled length is less than or equal to a threshold length, place the electrical cord in the power on state.

6. The electrical cord reel assembly of claim 5, wherein the controller comprises a memory device, the threshold length programmably storable on the memory device.

7. The electrical cord reel assembly of claim 1, wherein the controller is configured to continue transmitting the unwind signal to the motor after the electrical cord is placed in the power on state.

8. The electrical cord reel assembly of claim 1, wherein the controller is configured to automatically transmit an unwind termination signal to the motor to cause the motor to stop unwinding the electrical cord from the spool based at least in part on the amount of rotation of the spool during the unwinding.

9. The electrical cord reel assembly of claim 8, wherein the controller is configured to automatically transmit an unwind termination signal to the motor to cause the motor to stop unwinding the electrical cord from the spool if the amount of rotation of the spool exceeds a second threshold number of turns during the unwinding.

10. The electrical cord reel assembly of claim 1, wherein, in response to a stop unwind command, the controller is configured to transmit an unwind termination signal to the motor to cause the motor to stop unwinding the electrical cord from the spool.

11. The electrical cord reel assembly of claim 1, wherein, in response to a wind command, the controller is configured to transmit a wind signal to the motor to cause the motor to wind the electrical cord about the spool.

12. The electrical cord reel assembly of claim 11, wherein the controller is configured to automatically place the electrical cord in a power off state based at least in part on a second amount of rotation of the spool during the winding.

13. The electrical cord reel assembly of claim 11, wherein the controller is configured to automatically transmit a wind termination signal to the motor to cause the motor to stop winding the electrical cord around the spool.

14. The electrical cord reel assembly of claim 1, further comprising a remote control configured to wirelessly communicate with the controller.

15. The electrical cord reel assembly of claim 14, wherein the remote control is configured to wirelessly transmit the unwind command to the controller.

16. The electrical cord reel assembly of claim 14, wherein the remote control is configured to wirelessly transmit a power on or power off command to the controller.

17. The electrical cord reel assembly of claim 1, wherein the spool is configured to be mounted to a ceiling.

18. The electrical cord reel assembly of claim 17, wherein the spool is configured to mount to a track on the ceiling.

19. The electrical cord reel assembly of claim 1, further comprising a removable linear connecting element configured to removably connect the spool and the cord.

20. The electrical cord reel assembly of claim 1, further comprising the electrical cord.

21. A reel system comprising a plurality of reel assemblies, at least one reel assembly of the plurality of reel assemblies including the electrical cord reel assembly of claim 1.

22. The reel system of claim 21, further comprising a master control system to be in wireless communication with the controller of each reel assembly of the plurality of reel assemblies, the master control system configured to control the operation of the plurality of reel assemblies.

23. A method of controlling a reel assembly comprising a spool and an electrical cord coupled with the spool and configured to wind and unwind about the spool, the method comprising:

in response to an unwind command, placing or maintaining the electrical cord in a power off state;
in response to the unwind command, transmitting an unwind signal to a motor to cause the motor to unwind the electrical cord from the spool; and
automatically placing the electrical cord in a power on state based at least in part on an amount of rotation of the spool during the unwinding.

24. The method of claim 23, wherein the automatically placing comprises:
during the unwinding, monitoring an unspooled length of the electrical cord that has been unwound from the spool during the unwinding; and
when the unspooled length is greater than or equal to a threshold length, placing the electrical cord in the power on state.

25. The method of claim 23, further comprising continuing to transmit the unwind signal to the motor after the electrical cord is placed in the power on state.

26. The method of any one of claim 23, further comprising, when the spool length is less than or equal to a second threshold length, automatically transmitting an unwind termination signal to the motor to cause the motor to stop unwinding the electrical cord from the spool.

27. The method of claim 23, further comprising, in response to a stop unwind command, transmitting an unwind termination signal to the motor to cause the motor to stop unwinding the electrical cord from the spool.

28. The method of claim 23, further comprising, in response to a wind command, transmitting a wind signal to the motor to cause the motor to wind the electrical cord about the spool.

29. The method of claim 28, further comprising automatically transmitting a wind termination signal to the motor to cause the motor to stop winding the electrical cord around the spool.

30. The method of claim 23, further comprising placing the electrical cord in a power off state based at least in part on a second amount of rotation of the spool during the winding.

31. The method of claim 23, further comprising receiving the unwind command from a remote control.

32. A reel assembly comprising:
a spool configured to wind and unwind a linear element therefrom, the linear element comprising an electrical cord;
a motor configured to rotate the spool to wind and unwind the linear element about the spool; and
a controller in electrical communication with the motor, wherein the controller is configured to:
in response to an unwind command, transmit an unwind signal to the motor to cause the motor to unwind the linear element from the spool;
monitor an amount of rotation of the spool during the unwinding;
in response to the unwind command, place or maintain the electrical cord in a power off state; and
automatically place the electrical cord in a power on state based at least in part on an amount of rotation of the spool during the unwinding.

33. The reel assembly of claim 32, wherein the controller is configured to automatically place the electrical cord in the power on state if the amount of rotation of the spool exceeds a threshold number of turns during the unwinding.

34. The reel assembly of claim 32, wherein the controller is configured to:
during the unwinding, monitor an unspooled length of the electrical cord that has been unwound from the spool during the unwinding; and when the unspooled length is greater than or equal to a threshold length, place the electrical cord in the power on state.

35. The reel assembly of claim 32, wherein the controller is configured to continue transmitting the unwind signal to the motor after the electrical cord is placed in the power on state.

36. The reel assembly of claim 32, wherein the controller is configured to automatically transmit an unwind termination signal to the motor to cause the motor to stop unwinding the linear element from the spool based at least in part on the amount of rotation of the spool during the unwinding.

37. The reel assembly of claim 32, wherein, in response to a wind command, the controller is configured to transmit a wind signal to the motor to cause the motor to wind the linear element about the spool.

38. The reel assembly of claim 37, wherein the controller is configured to automatically transmit a wind termination signal to the motor to cause the motor to stop winding the linear element around the spool.

\* \* \* \* \*